United States Patent [19]
Schlegl

[11] Patent Number: 5,697,463
[45] Date of Patent: Dec. 16, 1997

[54] SUSPENSION FOR TRACK-LAYING VEHICLE

[75] Inventor: Eugen Schlegl, Gröbenzell, Germany

[73] Assignee: Krauss-Maffei AG, Munich, Germany

[21] Appl. No.: 668,006

[22] Filed: Jun. 19, 1996

Related U.S. Application Data

[63] Continuation of Ser. No. 88,409, Jul. 6, 1993, abandoned, which is a continuation of Ser. No. 769,110, Sep. 30, 1991, abandoned.

[30] Foreign Application Priority Data

| Oct. 1, 1990 | [DE] | Germany | 40 31 030.2 |
| Jul. 18, 1991 | [DE] | Germany | 41 23 778.1 |

[51] Int. Cl.$^6$ .................................................. B62D 55/104
[52] U.S. Cl. ............................ 180/9.5; 180/6.7; 280/700
[58] Field of Search .................... 180/6.7, 9.1, 9.44, 180/9.46, 9.5, 9.52, 9.54; 280/700, 717, 723, 721, 689, 797; 267/154, 157

[56] References Cited

U.S. PATENT DOCUMENTS

| 3,482,852 | 12/1969 | Hickman | 280/717 |
| 3,735,830 | 5/1973 | Talley | 180/9.5 |
| 3,980,149 | 9/1976 | Blomstrom et al. | 180/9.5 |
| 3,990,725 | 11/1976 | Allison | 280/700 |
| 3,994,352 | 11/1976 | Siorek | 180/9.1 |
| 4,325,443 | 4/1982 | Fischer et al. | 180/6.54 |
| 4,491,342 | 1/1985 | Aubry | 280/717 X |
| 4,521,033 | 6/1985 | Lenhard-Backhaus et al. | 280/700 |
| 4,582,153 | 4/1986 | Shinsen | 180/9.5 |
| 4,892,329 | 1/1990 | Kozaki et al. | 280/700 X |
| 4,893,687 | 1/1990 | Simmons | 180/9.1 |
| 4,966,386 | 10/1990 | Werdich | 280/717 |
| 4,991,872 | 2/1991 | Richardson | 280/717 |

FOREIGN PATENT DOCUMENTS

| 592 878 | 5/1925 | France . | |
| 0869090 | 1/1942 | France | 280/700 |
| 138 819 | 2/1920 | Germany . | |
| 25 55 021 | 8/1984 | Germany . | |
| 37 37 928 | 11/1987 | Germany . | |
| 37 20 126 | 12/1988 | Germany . | |
| 37 25 920 | 2/1989 | Germany . | |
| 8804239 | 6/1988 | WIPO | 280/700 |

OTHER PUBLICATIONS

"Principles of Automotive Vehicles"; Dept. of Army Technical Manual TM9-8000; Dept. of Air Force Technical Order TO 36A-1-76: Jan. 1956.

*Primary Examiner*—Kevin Hurley
*Attorney, Agent, or Firm*—Herbert Dubno; Andrew Wilford

[57] ABSTRACT

A track-laying vehicle has a frame with a pair of opposite sides, a track suspension on each side of the frame, and respective vibration-damping support bodies fixed on the suspensions and on the frame and securing the suspensions to the frame. Each suspension has a support housing movable relative to the side, road wheels journaled on the housing, a drive wheel journaled on the housing, and a track spanned over the respective wheels. In accordance with this invention a brace strut extending crosswise across the frame between the sides thereof has outer ends connected to the respective suspension housings. The strut can extend underneath the frame so that the forces caused by upward pressure of the ground on the ground wheels that tend to push out the bottoms of the suspension housings cancel each other out. The strut can also extend horizontally between the frames ahead of the front wall and another such strut can extend horizontally between the frames behind the back wall. These front and back struts cancel out the forces caused by tension in the belt that push out the front and back ends of the suspension housing.

12 Claims, 5 Drawing Sheets

SUSPENSION FOR TRACK-LAYING VEHICLE

CROSS REFERENCE TO RELATED APPLICATION

This is a file-wrapper continuation of application Ser. No. 08/088,409 filed 6 Jul. 1993 now abandoned, which is a continuation of Ser. No. 07/769,110, filed 30 Sep. 1991, now abandoned.

FIELD OF THE INVENTION

The present invention relates to a track-laying vehicle. More particularly this invention concerns a suspension system for such a vehicle.

BACKGROUND OF THE INVENTION

Each side of the frame of a track-laying vehicle is normally provided with an idler wheel, ground wheels, a drive wheel, and a track spanned over the wheels. Each road wheel is supported on its own suspension that can move at least limitedly vertically relative to the vehicle frame. German patent document 3,725,920 of R. Zurek et al describes a suspension system for a track-laying vehicle wherein each side of the vehicle is provided with a separate housing that can move limitedly vertically relative to the vehicle frame and that carries all of the various wheels and track for that side of the vehicle. To this end an extensive elastomeric body is bonded on one side to the side of the vehicle frame and on its other side to the suspension housing. Such a mounting system can, indeed, withstand the considerable loads such a suspension is subjected to in use, both the outward forces exerted by upward pressure of the ground on the road wheels and backward and forward pressures respectively exerted on the front and back wheels by the tension in the track.

Such an arrangement is relatively bulky and stiff and, therefore, expensive to manufacture. Furthermore it adds considerable weight to the vehicle without significantly improving its payload.

OBJECTS OF THE INVENTION

It is therefore an object of the present invention to provide an improved suspension for a track-laying vehicle.

Another object is the provision of such an improved suspension for a track-laying vehicle which overcomes the above-given disadvantages, that is which is relatively simple and light, yet which can withstand considerable stresses in use.

SUMMARY OF THE INVENTION

The track-laying vehicle according to the invention has a frame with a pair of opposite sides, a track suspension on each side of the frame, and respective vibration-damping support bodies fixed on the suspensions and on the frame and securing the suspensions to the frame. Each suspension has a support housing movable relative to the side, road wheels journaled on the housing, a drive wheel journaled on the housing, and a track spanned over the respective wheels. In accordance with this invention a brace strut extending crosswise across the frame between the sides thereof has outer ends connected to the respective suspension housings.

With this arrangement it is possible to substantially reduce the stresses that must be picked up by the vehicle frame. Instead they are balanced out between the two suspensions on the opposite sides of the vehicle since most forces tend to push identical portions of the suspensions on opposite sides of the vehicle laterally away from each other. Since these stresses are opposite each other, the brace strut causes them to cancel each other out so that the mounting bodies between the suspension housings and vehicle frame need merely withstand the vehicle weight and the difference between the opposing forces.

In accordance with the invention the strut extends underneath the frame. Such a strut makes the forces caused by upward pressure of the ground on the ground wheels that tend to push out the bottoms of the suspension housings cancel each other out. In an arrangement where the frame has front and back walls bridging the sides, the strut extends horizontally between the frames ahead of the front wall. Another such strut can extend horizontally between the frames behind the back wall. These front and back struts cancel out the forces caused by tension in the belt that push out the front and back ends of the suspension housing.

In a system where each suspension further includes a torsion bar supporting at least one of the respective road wheels the torsion bars are extended through the frame and constitute the strut. This is an extremely simple arrangement, merely requiring that each torsion bar be extended across the vehicle to have its far end seated in the opposite suspension housing rather than in its own suspension housing as is common practice.

According to a further feature of this invention the vehicle further comprises a drive shaft projecting through the side and housing. The bodies are elastomeric rings bonded to the sides and housings and surrounding the respective apertures in the housings and frame through which the drive shaft projects.

It is also within the scope of the invention for each suspension to be provided with at least one torsion bar extending through the housing and frame and connected to the respective road wheel. In this case the housing and frame is formed with apertures through which the torsion bars project and elastomeric rings surround the respective apertures.

Furthermore according to the invention each housing is formed as a vertical and horizontally extending plate and a box structure fixed to and stiffening the plate. This box structure can contain a shock absorber, end stop abutment, or other elements of the suspension and track drive.

With this invention the suspensions each include a crank arm supporting each road wheel and journaled in the box structure. Furthermore each support body is of small area and is bonded to the respective housing and to the respective side. Thus the instant invention eliminates the need for an extensive support body to solidly mount the suspension housing on the vehicle frame. The use of such small-area elastomeric mountings greatly reduces the transmission of vibration from the suspensions to the vehicle frame.

In accordance with further features of the invention the suspension housings are mounted via easily releasable couplings to the vehicle frame. Thus the entire suspension can be removed as a single unit. This makes air shipment of the vehicle much easier. The brace struts are similarly connected via snap couplings to the vehicle. In fact the two suspensions can be coupled to each other via such releasable couplings which can include screw and latch arrangements facilitating easy disassembly. Formations on the side walls of the housing can interfit with others on the facing side plates of the suspension housings to make disassembly a simple task.

BRIEF DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
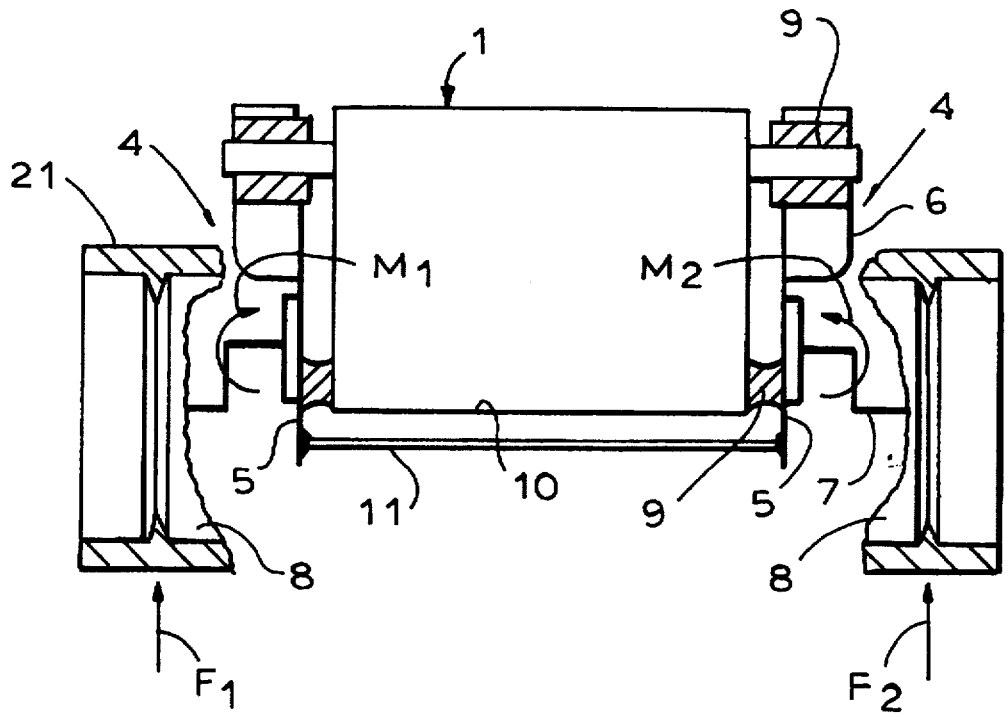
FIG. 1 is a largely diagrammatic vertical section through a vehicle according to the invention.

As seen in FIG. 1 a track-laying motor vehicle has a frame 1 with two vertical side walls 2 and 3 extending horizontally in the normal travel direction D (FIG. 3) of the vehicle and a bottom wall 10 bridging these side walls 2 and 3. Each side of the vehicle carries a track suspension or support housing 4 having a vertical and horizontally extending main plate 5 that is built out as a box 6 for stiffening purposes. Arms 7 on each suspension 4 carry road wheels 8 on which a track 21 runs when in contact with the ground. Small elastomeric blocks 9 constituting vibration-damping support bodies support the plates 5 on the respective side walls 2 and 3 to permit limited movement of the suspensions 4 relative to the frame 1, these blocks 9 not being sufficient to carry the entire load. According to this invention the plates 5 are interconnected underneath the bottom wall 10 by rigid tension- and compression-transmitting bars brace 11.

Thus with the system of this invention the moments $M_1$ and $M_2$ tending to pull the lower regions of the plates 5 outward are countered by the bars 11 which make these forces oppositely effective against each other and, therefore, cancel them out with respect to each other. The only force that need be resisted by the support blocks 9 is the difference between the moments $M_1$ and $M_2$ so that the blocks 9 can be much smaller and hence transmit less vibration than prior-art systems.

Figure 2:
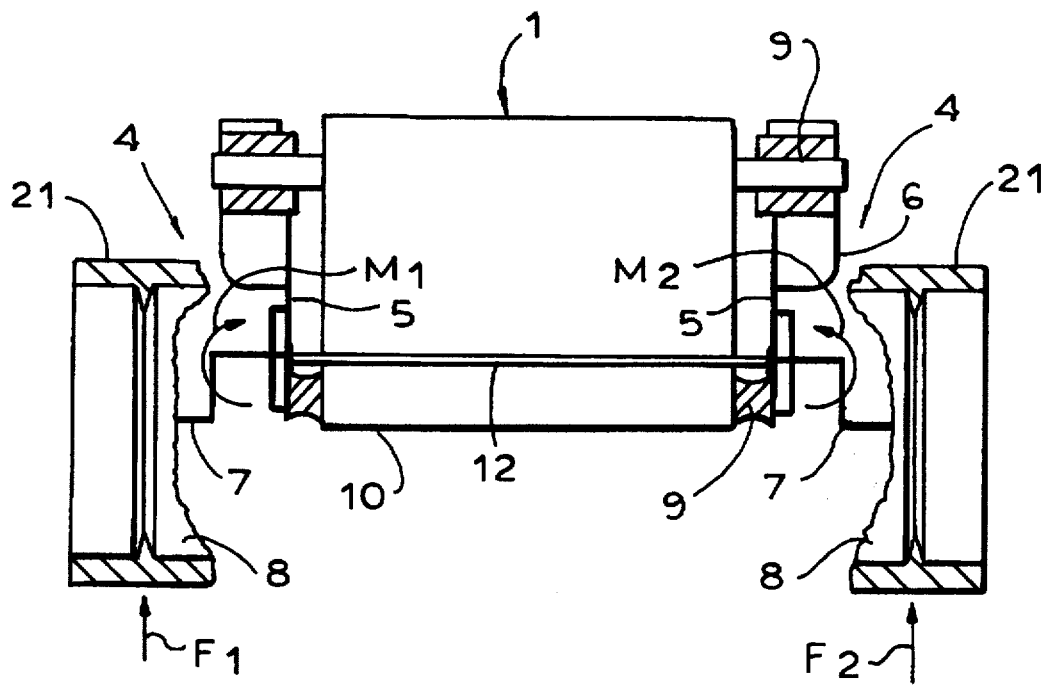
FIG. 2 is a view like FIG. 1 but showing another arrangement in accordance with the invention.

FIG. 2 shows a similar arrangement but where a torsion-bar 12 is connected from one suspension 4 to the other to act as the force-transmitting bar to cancel out the moments $M_1$ and $M_2$. The torsion bar 12 also serves for resisting vertical displacement of the road wheels 8 since the arms 7 are formed as cranks at the ends of these torsion bars 12. See German patent document 3,737,928 of U. Matzen for a discussion of such a torsion-bar supported road wheel.

Figure 3:
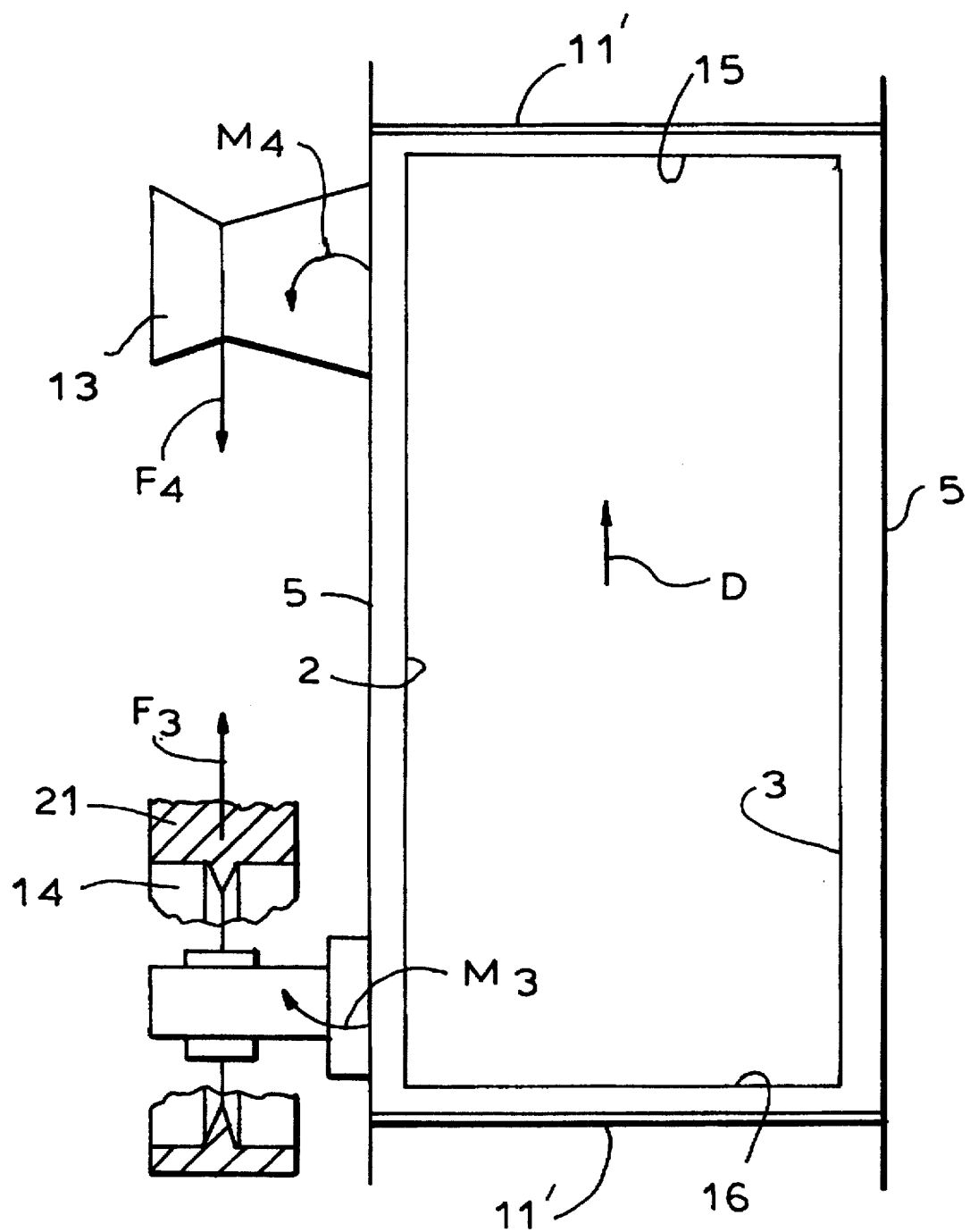
FIG. 3 is a schematic top view of the vehicle of this invention.

The top view of FIG. 3 shows details only of the left-side track mechanism, comprising a front idler wheel 13 and a rear drive wheel 14. Tension and compression/transmitting bars 11' bridge the extreme front and rear ends of the suspension plates 5, respectively immediately ahead of and behind the front and back walls 15 and 16 of the vehicle frame 1. Thus forwardly and rearwardly effective forces $F_3$ and $F_4$ created by tension in the track 21 spanned over the wheels 13 and 14 will create moments $M_3$ and $M_4$ tending to bend the front capstan 13 back and the rear wheel 14 forward are countered by these struts 11'.

Figure 4:
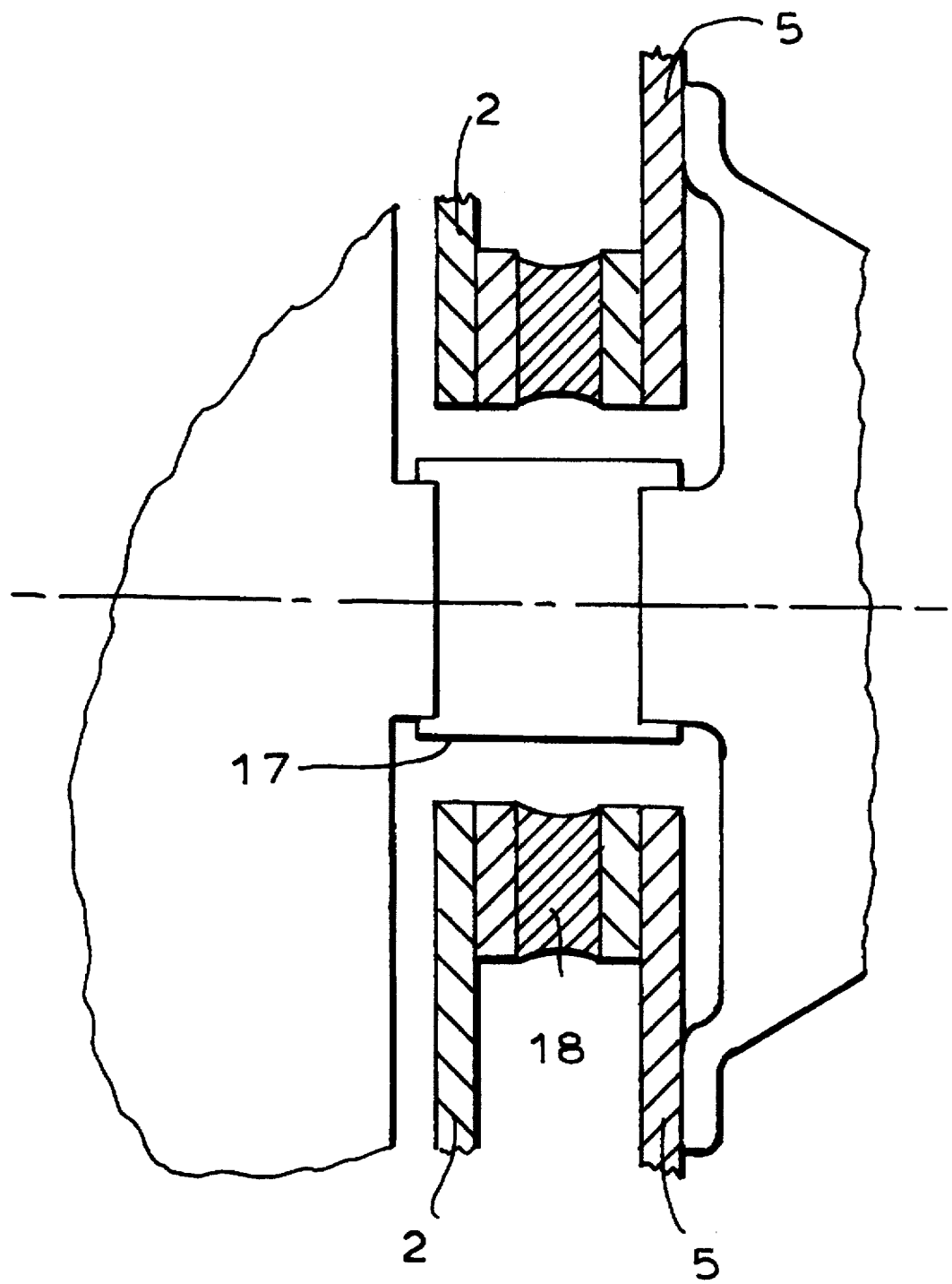
FIG. 4 is a vertical section through a detail of the vehicle.
Figure 5:
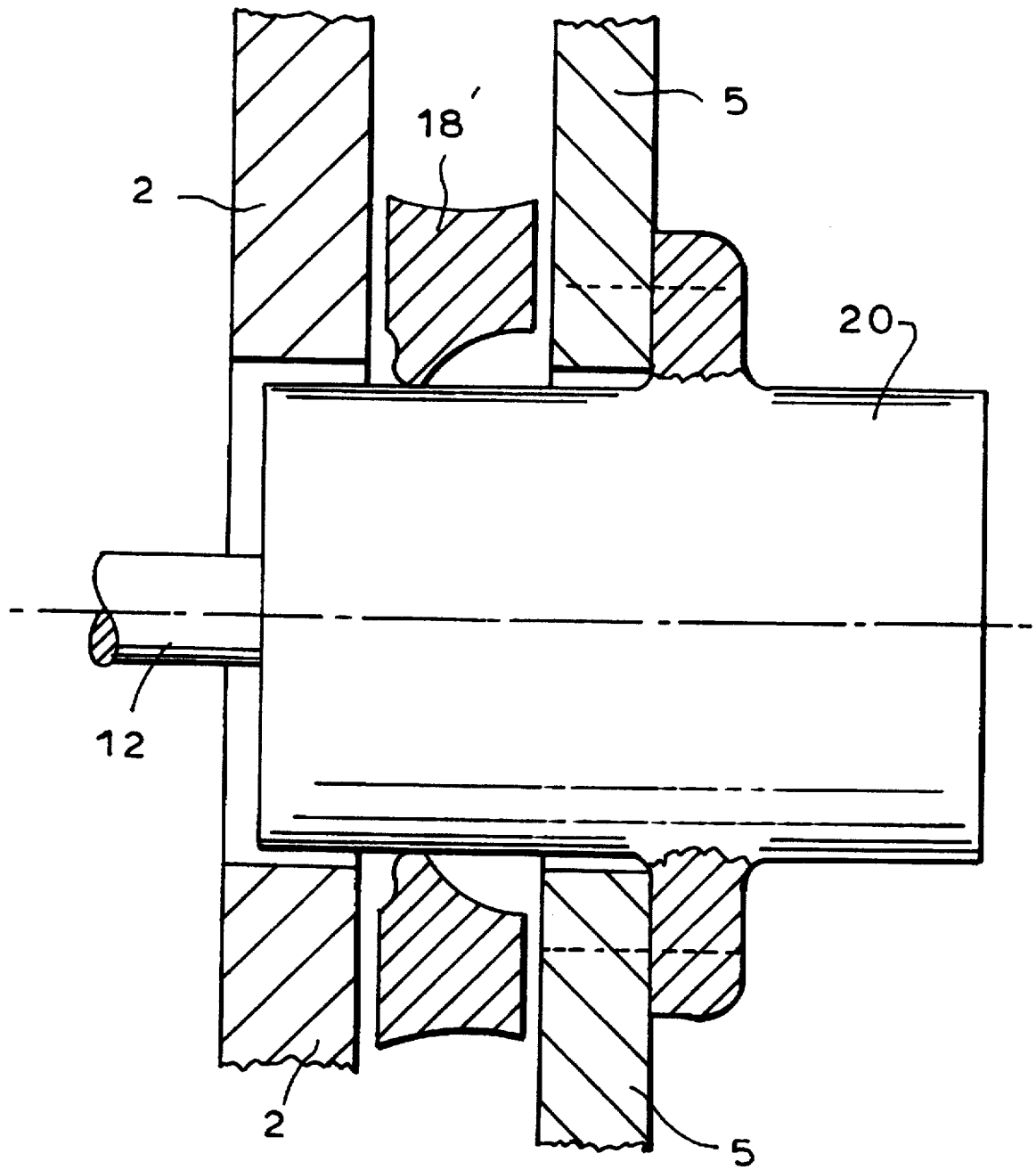
FIG. 5 is a vertical section through another detail of the vehicle.
Figure 7:
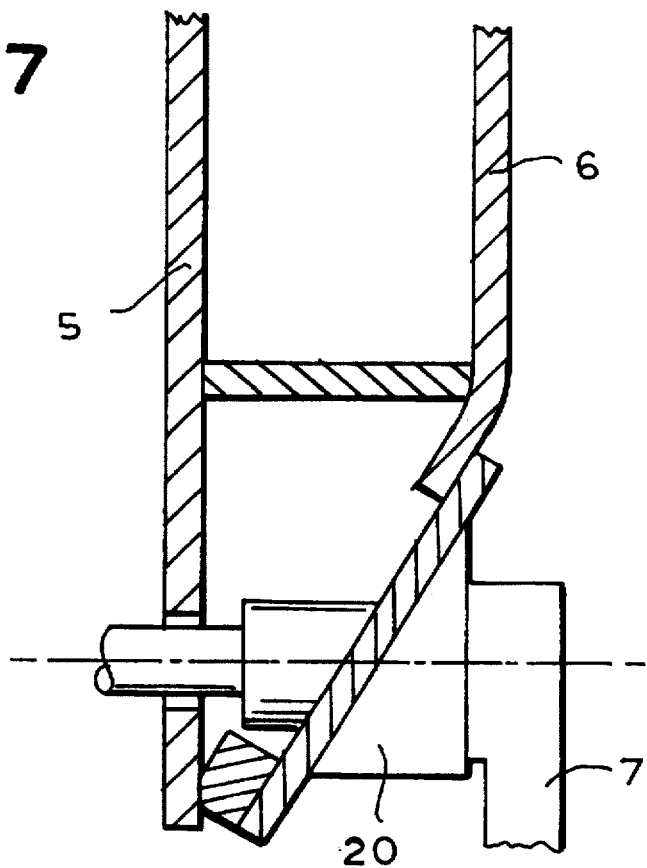

FIG. 4 shows how a drive shaft 17 for the wheel 14 extends through the side wall 2 and through the plate 5. A ring 18 of elastomeric material surrounds the apertures in the wall 2 and plate 5 and interconnects these elements while sealing around these apertures. Similarly in FIG. 5 another such ring 18' is provided for the apertures in the side wall 2 and plate 5 where a base 20 of the arm 7 is connected to the torsion bar 12. As seen in FIG. 7 the connection of this base 20 on the plate 5 and on the box structure 6 greatly stiffens the suspension 4.

Figure 6:
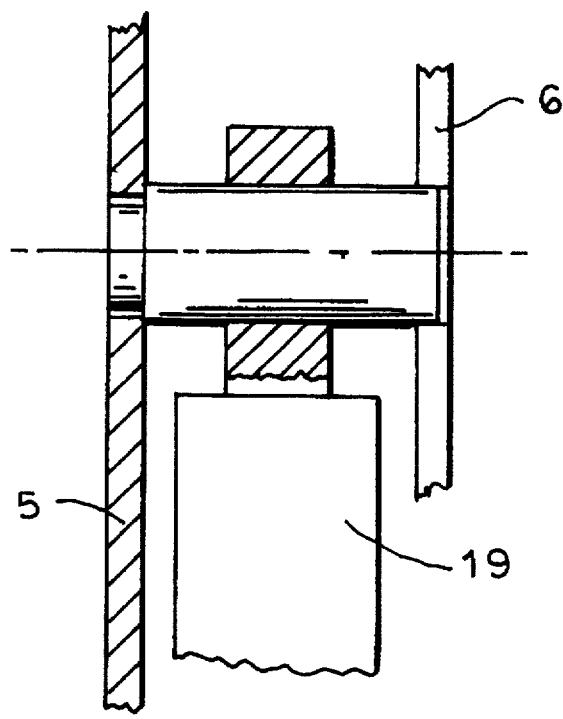
FIGS. 6 and 7 are vertical sections through different elements of the suspension of this invention.

In FIG. 6 a shock absorber 19 is carried both on the plate 5 and on the box stiffener 6 of the suspension 4.

I claim:

1. In a track-laying vehicle displaceable in a predetermined travel direction and having
a frame with a pair of opposite sides;
a track suspension on each side of the frame, each suspension in turn having
a housing movable relative to the respective side, respective road wheels journaled on the housing, a respective drive wheel journaled on the housing, and
a respective track spanned over the wheels of each housing; and
respective vibration-damping support bodies fixed on the suspensions and on the frame and securing the suspensions to the frame,
the improvement comprising
at least one brace bar extending transversely to the travel direction across the frame, out of direct contact with the frame, having outer ends fixed to the respective housings, and extending continuously between the respective outer ends.

2. The improved track suspension defined in claim 1 wherein the bar extends underneath the frame.

3. The improved track suspension defined in claim 1 wherein the frame has front and back walls bridging the sides and the bar extends horizontally between the housings ahead of the front wall.

4. The improved track suspension defined in claim 1 wherein the frame has front and back walls bridging the sides and the bar extends horizontally between the housings behind the back wall.

5. The improved track suspension defined in claim 1 wherein each suspension further includes a torsion bar supporting at least one of the respective road wheels, the torsion bars extending through the frame and constituting the brace bar.

6. The improved track suspension defined in claim 1 wherein the vehicle further comprises
a drive shaft projecting through each side and housing, the sides and housings being formed with apertures through which the shaft projects, the bodies being elastomeric rings bonded to the sides and housings and surrounding the respective apertures.

7. The improved track suspension defined in claim 1 wherein each suspension is further provided with
at least one torsion bar extending through the housing and frame and connected to a respective one of the road wheels, the housing and frame being formed with apertures through which the torsion bar projects,
the improvement further comprising
respective elastomeric rings surrounding the apertures.

8. The improved track suspension defined in claim 1 wherein each housing is formed as a vertical and horizontally extending plate and a box structure fixed to and stiffening the plate.

9. The improved track suspension defined in claim 8, further comprising a shock absorber contained in the box structure.

10. The improved track suspension defined in claim 8 wherein the suspensions each include a respective crank arm supporting each road wheel and journaled in the box structure.

11. The improved track suspension defined in claim 1 wherein each body is of small area and is bonded to the respective housing and to the respective side.

12. A track-laying vehicle displaceable in a predetermined travel direction and comprising:

- a frame with a pair of opposite sides extending in the travel direction;
- a respective track suspension on each side of the frame, each suspension in turn having
  - a respective housing movable relative to the respective side,
  - respective road wheels journaled on the housings,
  - a respective drive wheel journaled on the housings, and
  - a respective track spanned over the wheels of each housing;
- respective vibration-damping elastomeric support bodies each having an outer side bonded to the respective housing and an inner side bonded to the frame and securing the housings to the frame; and
- at least one elongated brace bar extending transversely to the travel direction across the frame, out of contact with the frame, having outer ends fixed to the respective housings, and extending continuously between the outer ends.

* * * * *